Figure 1A:
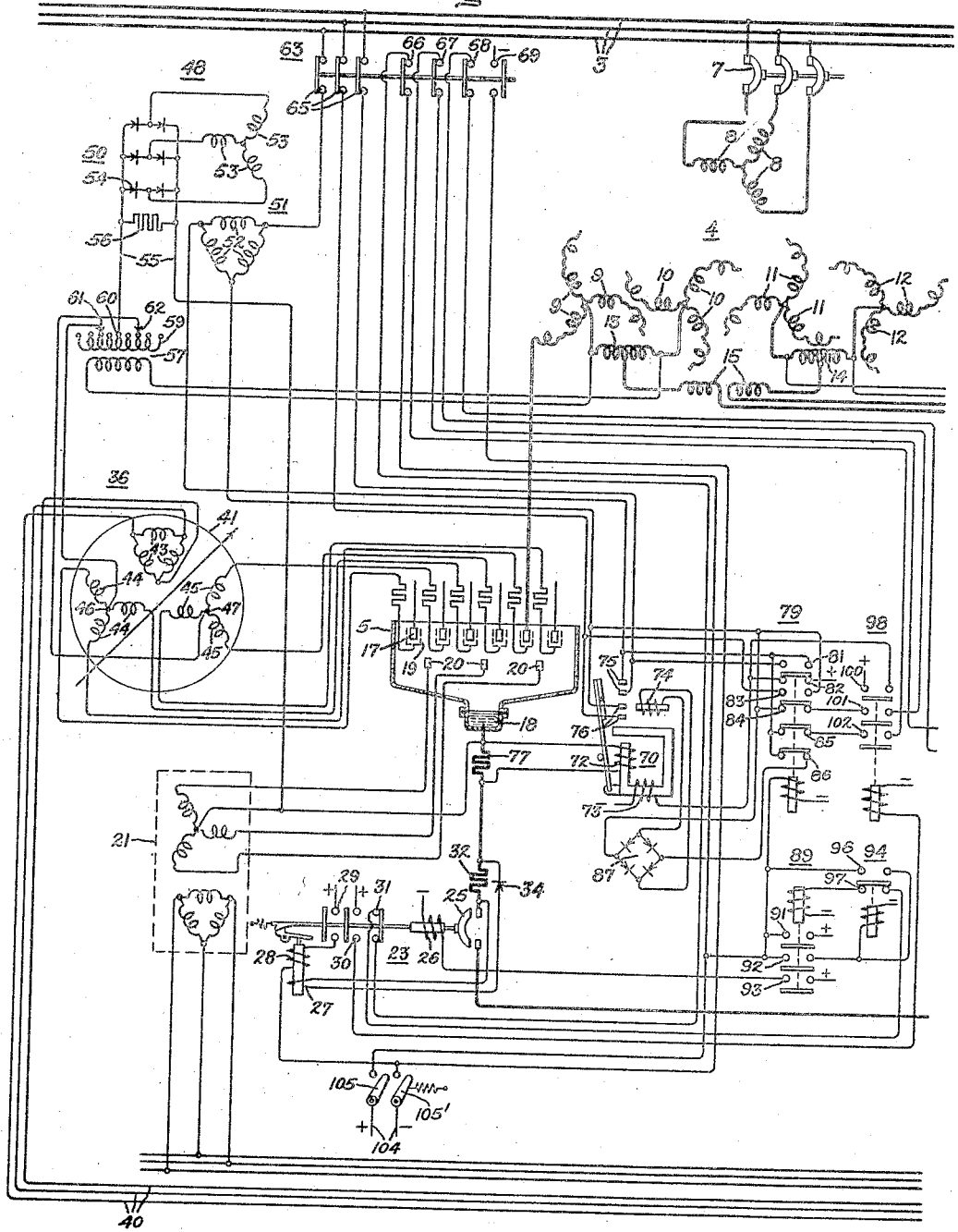

Patented Sept. 30, 1941

2,257,449

UNITED STATES PATENT OFFICE 2,257,449

PROTECTIVE SYSTEM FOR ELECTRIC VALVE APPARATUS

Herman Bany, Lansdowne, Pa., assignor to General Electric Company, a corporation of New York Application May 22, 1940, Serial No. 336,572

7 Claims. (Cl. 175—363)

My invention relates to protective systems and more particularly to protective systems for electric valve translating apparatus such as electric valve means employing an ionizable medium.

Where a plurality of electric valve means or electric valve translating apparatus are operated in parallel to transmit power concurrently, it is important in many applications to provide protective means to prevent damage to the apparatus in the event of an arc-back. In accordance with the teachings of my invention described hereinafter, I provide new and improved protective apparatus for translating systems of this nature.

It is an object of my invention to provide new and improved protective systems for electric valve translating apparatus.

It is another object of my invention to provide a new and improved protective system for a plurality of electric valve translating apparatus, which are operated in parallel, wherein the arc-back is suppressed in a faulty electric valve means and whereby the other or normal operating electric valve means are controlled until the faulty electric valve means is isolated or disconnected from the system.

Briefly stated, in the illustrated embodiment of my invention I provide an improvement in protective systems for electric valve translating apparatus such as that disclosed and claimed in my copending joint patent application Serial No. 313,384, filed January 11, 1940, and assigned to the assignee of the present application. More specifically, in the illustrated embodiment of my invention I provide a protective system for a group or plurality of electric valve means which operate in parallel relation to transmit current concurrently to a direct current load circuit from an alternating current supply circuit. Each of the electric valve means is of the controlled type having a control member which controls the current conducted by that electric valve means, and each is provided with a suitable rectifier to produce a negative unidirectional biasing potential sufficient to render that electric valve means nonconductive when it is properly energized. Upon the occurrence of an abnormal operating condition, such as an arc-back upon one of the electric valve means, the associated rectifier is energized, thereby producing a biasing potential which is impressed on the grids of that electric valve means. A biasing potential is also impressed on the grids of the other or normal electric valve means thereby preventing the latter from conducting a heavy or overload current during occurrence of the arc-back condition. Circuit interrupting means are also provided in series relation with the electric valve means and are connected to be moved to the open circuit position upon the occurrence of an arc-back in the associated electric valve means. As soon as the associated circuit interrupting means is moved to the circuit interrupting position, the biasing potential is removed from the grids of the normal electric valve means, permitting the normal electric valve means to conduct current and assume load. The arc suppression voltage is maintained on the grids of the faulty electric valve means until the circuit interrupting means is reclosed.

Figure 1B:
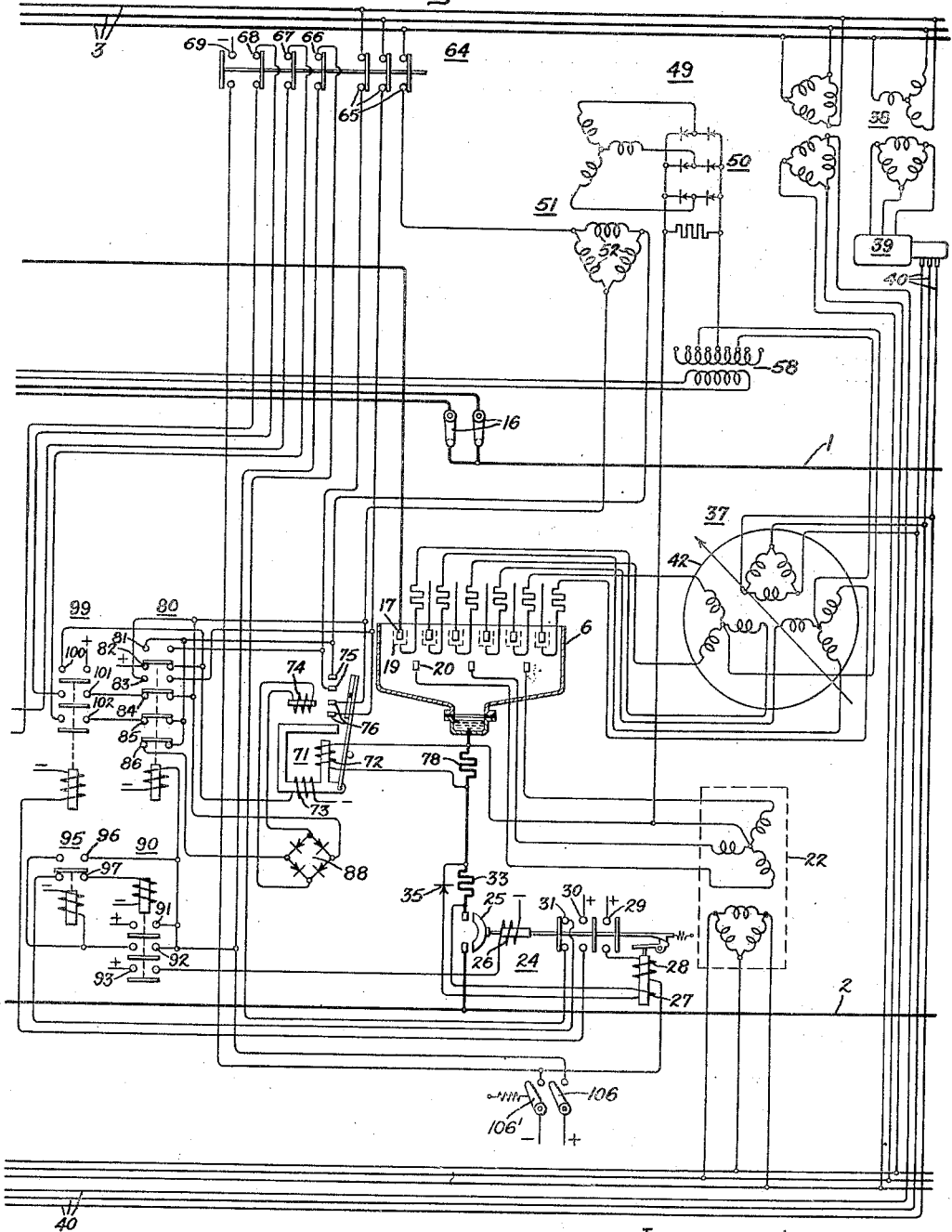

For a better understanding of my invention, reference may be had to the following description, taken in connection with the accompanying drawings, and its scope will be pointed out in the appended claims. Figs. 1a and 1b when placed together diagrammatically illustrate an embodiment of my invention as applied to a rectifying system wherein two electric valve means are connected to operate in parallel relationship.

Referring now to Figs. 1 and 1b, considered jointly, I have diagrammatically illustrated my invention as applied to an electric valve translating system for energizing a direct current load circuit comprising conductors 1 and 2 from an alternating current supply circuit 3. The translating apparatus connected between the direct current circuit and the alternating current circuit comprises a transformer 4 and a plurality of electric valve means 5 and 6 which operate in parallel to transmit unidirectional current concurrently to the direct current circuit. A suitable switch or circuit interrupting means 7 may be connected in series relation with primary windings 8 of the transformer 4. The secondary windings of transformer 4 may be arranged in four groups comprising secondary windings 9, 10, 11 and 12. These secondary windings are each provided with a neutral connection and may be arranged in a quadruple-Y-zigzag connection. Groups of secondary windings 9 and 10 are interconnected through the interphase transformer 13 and are associated with electric valve means 5, and groups of secondary windings 11 and 12 are interconnected through interphase transformer 14 and are associated with electric valve means 6. The aforementioned groups of secondary windings are in turn interconnected through interphase transformer 15 which is connected to conductor 1 of the direct current load circuit through suitable switching means 16.

Electric valve means 5 and 6 may be of the type comprising a plurality of anodes 17, a single cathode 18, and having a plurality of control members or grids 19 each associated with a different one of the anodes. In addition, the electric valve means 5 and 6 may each be provided with a plurality of excitation or holding anodes 20 energized from transformers 21 and 22, respectively. Although I have represented my invention as applied to an electric valve means of the type including a plurality of anodes and a single cathode, it will, of course, be understood that I may employ a plurality of individual electric valve means each having a single anode and a cathode.

I provide in series relation with the electric valve means 5 and 6 a plurality of circuit interrupting means 23 and 24 connected in series relation with electric valve means 5 and 6, respectively. Each of the circuit interrupting means 23 and 24 comprises principal contacts 25, a closing coil 26, a reverse current trip coil 27, a trip coil 28 and auxiliary contacts 29, 30 and 31. The reverse current trip coils 27 of circuit interrupting means 23 and 24 may be energized from suitable shunts 32 and 33 connected in series relation with electric valve means 5 and 6, respectively. Selective means, such as unidirectional conducting devices 34 and 35, may be connected between the shunts 32 and 33, respectively, to control the energization of the trip coils 27 in response to reverse current.

As a means for controlling the conductivity of the electric valve means 5 and 6, I provide a plurality of excitation circuits 36 and 37 which may be energized from a suitable source of alternating current of the desired frequency, such as the alternating current circuit 3, through a transformer 38 and a master phase shifting device such as a rotary phase shifter 39. The output circuit 40 of the rotary phase shifting device is connected to individual phase shifting devices 41 and 42 which also may be of the rotary phase shifting type and which are associated with electric valve means 5 and 6, respectively. Each of the rotary phase shifting devices 41 and 42 comprises primary windings 43 and a plurality of secondary windings 44 and 45 having neutral connections 46 and 47, respectively. It is to be understood that phase shifting devices 41 and 42 may be of the rotary type. Devices 41 and 42 impress periodic or alternating voltages on grids 19 of electric valve means 5 and 6.

I have found that in electric valve power transmitting systems employing a plurality of rectifying units it is difficult to assure positive control of the various electric valve means under excessive load conditions or under arc-back conditions where only one or a single source of negative unidirectional biasing potential is employed for load reduction or arc-back suppression. Consequently, in accordance with my invention described herein I employ a plurality of individual auxiliary rectifiers, each associated with a different one of the main electric valve rectifiers, to provide isolation between the main rectifier direct current circuits. An advantage of this arrangement is that it permits paralleling of the primary windings of the transformers, associated with each of the main power rectifiers, by means of a common relay circuit and thus applies effective suppression to all rectifiers simultaneously at the time of an arc-back or overload condition on any one of them.

In order to provide arc suppression voltages, such as negative unidirectional biasing potentials, sufficient in magnitude to overcome the effect of the sinusoidal component of voltages impressed on the control grids 19 by the excitation circuits 36 and 37, I provide a plurality of arc suppression or control circuits 48 and 49 each comprising a rectifier 50 energized from a suitable transformer 51 having primary windings 52 and secondary windings 53. The rectifiers 50 are preferably of the full wave type and may comprise a plurality of contact rectifiers 54. The output circuit 55 of the rectifiers 50 may include a resistance 56 connected thereacross to act as a loading resistance for the grid circuit and to permit biasing of the grids. Interconnected between the control circuits 48 and 49 and the excitation circuits to control the distribution of load among the groups of secondary windings 9, 10 and 11, 12, I employ inductive devices 57 and 58 which are energized in response to the voltage appearing across the interphase transformers 13 and 14, respectively. The broad features of this control circuit are disclosed and claimed in a copending application Serial No. 332,974 of C. H. Willis and M. A. Edwards, filed May 2, 1940, and which is assigned to the assignee of the present application. Transformers 57 and 58 are provided with secondary windings 59 having neutral connections 60 and a plurality of adjustable connections 61 and 62 which are connected to neutral connections 46 and 47, respectively, of the phase shifting devices 41 and 42. In this manner, load division between the groups of secondary windings in the two rectifying units is maintained substantially equal.

Suitable isolating means, such as switches 63 and 64, may be connected in series relation with the primary windings 52 of transformers 51. Each of the switches 63 and 64 comprises a plurality of principal contacts 65 and auxiliary or interlocking contacts 66—69. One terminal of the delta primary windings 52 of transformer 51 is connected at all times to one terminal of the alternating current circuit 3, but the connection of the other two terminals, and hence the energization of the primary windings 52, are not completed until apparatus, described hereinafter, has completed a sequence of operation. That is, normally the transformers 51 are not energized and are energized only upon the occurrence of an arc-back or other abnormal operating condition.

To render the electric valve means 5 and 6 non-conducting upon the occurrence of an abnormal operating condition, such as arc-back, I provide suitable means such as relays 70 and 71 associated with electric valve means 5 and 6, respectively, for effecting energization of primary windings 52 of transformers 51 in control circuits 48 and 49. Each of relays 70 and 71 comprises an actuating coil 72, a field coil 73, a holding coil 74 and contacts 75 and 76, which, when the armatures thereof are attracted, effect energization of windings 52. Relays 70 and 71 may be connected to be responsive to the reverse current conducted by the electric valve means 5 and 6, respectively, upon the occurrence of an arc-back condition. The actuating coil 72 may be selectively energized in response to reverse current or may be energized in response to excessive current which flows through electric valve means 5 and 6 upon the occurrence of an arc-back. As illustrated in the drawings, actuating coils 72 are shown as being energized in response to the voltage across shunts 77 and 78 connected in series relation with electric valve means 5 and 6, respectively.

I employ auxiliary means, such as auxiliary relays 79 and 80 for relays 70 and 71, respectively.

Each of relays 79 and 80 may comprise contacts 81—86. Contacts 81 and 83 thereof are connected across contacts 75 and 76 of relays 70 and 71 and serve to seal in or assure energization of transformers 51 during the resetting operation, so that the negative biasing potentials impressed on grids 19 are maintained until the circuit breakers 23 and 24 are closed. Contacts 84 and 85 are normally closed in the deenergized position of relays 79 and 80, so that a negative biasing potential is also impressed on the control members of the other or normal electric valve means by energizing the other associated rectifiers. Contacts 86 are connected in series relation with the holding coils 74 of relays 70 and 71 through suitable rectifiers 87 and 88 which transmit unidirectional current to these holding coils, thereby assuring energization of the holding coils until the system is reset. During the resetting operation the actuating coils of relays 79 and 80 are energized effecting deenergization of the holding coils 74 and opening contacts 75 and 76.

I provide additional relays 89 and 90 which are auxiliary relays for circuit interrupting means 23 and 24, respectively, and each of which comprises contacts 91, 92 and 93. In addition, I also provide relays 94 and 95 as auxiliary relays for relays 89 and 90, respectively. Relays 94 and 95 are provided with contacts 96 and 97.

As an agency for initiating the provision of a negative biasing potential for the other or normal electric valve means when one electric valve means arc back, I provide relays 98 and 99 having contacts 100, 101 and 102. Relays 98 and 99 are normally in the energized position during normal operation of the electric valve means 5 and 6, and the actuating coils thereof are energized from a suitable source of direct current 104 through auxiliary contacts 30 of circuit interrupting means 23 and 24. As a means for initiating operation of the system by the closing of the circuit interrupting means 23 and 24 and as a means for resetting an electric valve means which has been subjected to an arc-back condition, I provide a suitable means, such as control switches 105 and 106, biased to the open circuit positions. Switches 105′ and 106′ are also employed as means to control trip coils 28 of circuit interrupting means 23 and 24.

The operation of the embodiment of my invention represented in Figs. 1a and 1b will be explained by considering the system when it is operating to transmit power to the direct current circuit from the alternating current supply circuit. The electric valve means 5 and 6 operate in parallel as a quadruple three phase system. The electric valve means 5 and the groups of secondary windings 9 and 10 operate as a double three phase system, each anode conducting current for 120 electrical degrees but for only 60 electrical degrees with any one other anode in the other group. Electric valve means 6 and its associated secondary windings 11 and 12 operate in a similar fashion so that four anodes, one in each group, conduct current at any one time.

Normally, the control circuits 48 and 49 are not energized even though switching means 63 and 64 are in the closed circuit positions. Consequently, these circuits during normal operation do not produce biasing potentials. The rotary phase shifting devices 41 and 42 in excitation circuits 36 and 37 are adjusted to impress on the control grids 19 of electric valve means 5 and 6 periodic voltages or alternating voltages of the proper phase displacement to obtain the desired output impressed across the direct current load circuit. The master phase shifter 39 may be employed to obtain joint control of the electric valve means 5 and 6.

To initiate operation of the system, the control switches 105 and 106 are moved to the left-hand positions. Upon such operation, the actuating coils of relays 89 and 90 are energized through the following circuits: The positive terminal of circuit 104, auxiliary contacts 66 of switching means 63 and 64, auxiliary contacts 31 of circuit interrupting means 23 and 24, normally closed contacts 97 of relays 94 and 95, the actuating coils of relays 89 and 90 and the negative terminal of the circuit 104. Operation of relays 89 and 90 effects energization of the operating coils or relays 94 and 95. Closure of contacts 93 of relays 89 and 90 energizes closing coils 26 of circuit interrupting means 23 and 24. The circuit interrupting means 23 and 24 are each locked in the closed circuit position. Upon closure, circuit interrupting means 23 and 24 close the auxiliary contacts 30 thereof to energize the actuating coils of relays 98 and 99. It will thus be appreciated that under these conditions the electric valve means 5 and 6 conduct current in parallel relationship, and the amount of current transmitted thereby is determined by the settings of the rotary phase shifters 41 and 42.

Trip coils 28 of circuit interrupting means 23 and 24 will be energized through contacts 69 to open the circuit interrupting means 23 and 24 if the switching means 63 and 64 are not in the closed circuit positions, thereby preventing operation of the system unless the arc-back protection equipment is in condition to perform its normal and intended function upon the occurrence of an arc-back.

If an arc-back occurs on one of the electric valve means, the associated control circuit will be energized to impress an arc suppression voltage on the grids of the faulty electric valve means and also effect energization of the primary windings of the transformers in the arc suppression circuits of the normal electric valve means. For example, if the arc-back occurs upon the electric valve means 5, primary winding 52 of transformer 51 in arc suppression circuit 48 will be energized by the closure of contacts 75 and 76 of relay 70. The actuating coil 72 of relay 70 is energized from the shunt 77, and the contacts 75 and 76 are maintained in the closed position by the holding coil 74. Negative biasing voltage is impressed on grids 19 of electric valve means 5 through the output circuit of rectifier 50 and secondary windings 44 and 45 of phase shifting device 41. Consequently, the arc is suppressed. Primary windings 52 of transformer 51 in the arc suppression circuit 49 are also energized in response to the operation of relay 70 by virtue of the interconnection between the contacts of relays 79, 98, 99 and 80. More specifically, the energizing circuits for primary windings 52 of transformer 51 in circuit 49 are completed through contacts 84 and 85 of relay 79, contacts 101 and 102 of relay 98, auxiliary contacts 67 and 68 of switching means 63, auxiliary contacts 67 and 68 of switching means 64, contacts 101 and 102 of relay 99 and contacts 84 and 85 of relay 80. It will be understood that the actuating coils for relays 98 and 99 are energized so long as the circuit interrupting means 23 and 24 are closed. However, as soon as the associated circuit interrupting means opens, the associated relay also opens.

For example, as soon as circuit interrupting means 23 opens, due to the occurrence of the reverse current, auxiliary contacts 30 interrupt the actuating coil for relay 98 and this relay becomes deenergized opening contacts 101 and 102 and thereby deenergizes the primary windings 52 of transformer 51 in circuit 49 and consequently removes the negative biasing potential from the grids 19 of electric valve means 6. It will thus be appreciated that after the circuit interrupting means of a faulty electric valve means is opened, disconnecting the faulty rectifier from the system, the negative biasing potential is automatically removed from the normal electric valve means permitting the normal electric valve means to transmit load current.

It will be appreciated that my system also operates in response to arc-back condition on the electric valve means 6 to isolate that unit and to reduce automatically the load on the electric valve means 5 and to re-apply load automatically to electric valve means 5 as soon as the circuit interrupting means 24 is opened.

To reset or place in operation the faulty electric valve means which has been subjected to an arc-back condition, control switch 105 or 106 is moved to the left-hand position. For example, if valve means 5 arcs back, closure of switch 105 energizes relay 89 and 94 in the usual manner to energize closing coil 26 of circuit interrupting means 23 and thus close the principal contacts 25 thereof. Also, at the same time the actuating coil of relay 79 is energized which immediately bridges the contacts 75 and 76 of relay 70. The operation of relay 79 opens the circuit for holding coil 74 and the field coil of relay 70 which causes the armature of this relay to open its contacts 75 and 76. Upon closure of circuit interrupting means 23 and opening of relay 79, electric valve means 5 which was subjected to a fault condition is again placed in condition to carry its intended load.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a direct current circuit, electric translating apparatus connected between said circuits and comprising a plurality of electric valve means each having at least one anode, a cathode and a control member for controlling the current conducted thereby, a plurality of circuit interrupting means each associated with a different one of said electric valve means and connected in series relation therewith, means for impressing on the control members of said electric valve means a periodic voltage, a plurality of means each associated with a different one of said electric valve means and each comprising a rectifier energized from said alternating current circuit for producing a negative unidirectional biasing potential sufficient when impressed on the control member of the associated electric valve means to render that electric valve means nonconducting, and a plurality of means each individually responsive to an abnormal operating condition of a different one of said electric valve means for impressing a biasing potential on the control member of the associated electric valve means and for energizing the other rectifiers to impress a biasing potential on the control member of the other electric valve means.

2. In combination, an alternating current circuit, a direct current circuit, electric translating apparatus connected between said circuits and comprising a plurality of electric valve means each having at least one anode, a cathode and a control member for determining the current conducted thereby, a plurality of excitation means associated with said electric valve means for impressing on the control member a periodic voltage to determine the current conducted by said electric valve means, a plurality of individual rectifiers energized from said alternating current circuit and each associated with a different one of said electric valve means for producing a negative unidirectional biasing potential sufficient when impressed on the associated control member to render the electric valve means nonconducting, a plurality of means each associated with a different one of said electric valve means and each responsive to an abnormal operating condition of that electric valve means for impressing a negative biasing potential supplied by the associated rectifier on the control member of that electric valve means and for controlling the rectifiers associated with the other electric valve means to impress biasing potentials on the control members thereof thereby rendering said other electric valve means nonconducting, and means interconnecting said plurality of last mentioned means to effect removal of the biasing potential from the control members of the normal electric valve means.

3. In combination, an alternating current circuit, a direct current circuit, electric translating apparatus connected between said circuits and comprising a plurality of electric valve means each having an anode, a cathode and a control member for controlling the current conducted thereby, a plurality of excitation circuits for impressing on the control members of the various electric valve means a periodic voltage, a plurality of rectifiers each associated with a different electric valve means for producing a negative biasing potential sufficient to render the electric valve means nonconducting, a plurality of circuit interrupting means each connected in series relation with a different one of said electric valve means, a plurality of means each responsive to an electrical condition of a different one of said electric valve means for impressing the negative biasing potential of the associated rectifier on the control member thereof and for effecting energization of the rectifiers associated with the other electric valve means to render all of the electric valve means nonconducting upon the occurrence of an abnormal operating condition of one electric valve means, and means responsive to the operation of the electric valve means subjected to the abnormal condition for removing the biasing potential from said other electric valve means.

4. In combination, an alternating current circuit, a direct current circuit, electric translating apparatus connected between said circuits and comprising a plurality of electric valve means each having an anode, a cathode and a control member for controlling the current conducted thereby, a plurality of excitation circuits each associated with a different one of said electric valve means for impressing on the control member thereof a periodic voltage, a plurality of circuit interrupting means each associated with a different one of said electric valve means and each connected in series relation therewith, a plurality of rectifiers each associated with a different one of said electric valve means for producing a negative unidirectional biasing potential sufficient to render the electric valve means nonconducting and each comprising a rectifier, a plurality of means each associated with a different one of said electric valve means and each responsive to an abnormal operating condition thereof for energizing the associated rectifiers to render all of the electric valve means nonconducting, means responsive to the occurrence of said abnormal operating condition for operating the associated circuit interrupting means to the open circuit position, and means responsive to the operation of said circuit interrupting means for removing the biasing potentials from the control members of the normal electric valve means.

5. In combination, an alternating current circuit, a direct current circuit, electric translating apparatus connected between said circuits and each comprising a plurality of electric valve means each having an anode, a cathode and a control member, a plurality of excitation circuits for impressing on the control members periodic voltages, a plurality of individual means each associated with a different one of said electric valve means and each comprising a transformer and a rectifier for producing a negative unidirectional biasing potential sufficient when impressed on the control members of the electric valve means to render the electric valve means nonconducting, a plurality of means each connected to a different one of said electric valve means and each responsive to an abnormal operating condition thereof for energizing the associated transformer upon the occurrence of said abnormal condition and for energizing the transformers associated with the normal operating electric valve means to render the normal operating electric valve means nonconducting, and means interconnecting the last mentioned means to effect deenergization of the transformers associated with the normal operating electric valve means upon isolating the electric valve means which has been subjected to the abnormal operating condition.

6. In combination, an alternating current circuit, a direct current circuit, electric translating apparatus connected between said circuits and comprising a plurality of electric valve means each having an anode, a cathode and a control member for controlling the current conducted thereby, a plurality of excitation circuits for impressing on the control member periodic voltages to control the current conducted thereby, a plurality of means each associated with a different one of said electric valve means and each comprising a rectifier for producing a negative unidirectional biasing potential which when impressed on the control member is sufficient to render the electric valve means nonconducting, and a plurality of means each associated with a different one of said electric valve means and each individually responsive to an abnormal operating condition thereof for energizing the associated rectifier in response to the occurrence of said abnormal condition and for effecting energization of the other rectifiers to impress biasing potentials upon the control members of the other electric valve means.

7. In combination, an alternating current circuit, a direct current circuit, electric translating apparatus connected between said circuits and comprising a plurality of electric valve means each having an anode, a cathode and a control member for controlling the current conducted thereby, a plurality of excitation circuits for impressing on the control members periodic voltages, a plurality of means each associated with a different one of said electric valve means and each comprising a rectifier for producing a negative unidirectional biasing potential which when impressed on the control members is sufficient to render the electric valve means nonconducting, a plurality of switching means connected between said alternating current circuit and the rectifiers, a plurality of circuit interrupting means each connected in series relation with a different one of said electric valve means, and interlocking means connected between said switching means and said circuit interrupting means to prevent closure of said circuit interrupting means when said switching means is in the open circuit position.

HERMAN BANY.